United States Patent
Isgar

(10) Patent No.: US 12,505,754 B2
(45) Date of Patent: Dec. 23, 2025

(54) GLOBAL LANGUAGE EDUCATION AND CONVERSATIONAL CHAT SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

(21) Appl. No.: 18/449,263

(22) Filed: Aug. 14, 2023

(65) Prior Publication Data

US 2023/0394985 A1    Dec. 7, 2023

Related U.S. Application Data

(63) Continuation of application No. 16/993,200, filed on Aug. 13, 2020, now abandoned.
(Continued)

(51) Int. Cl.
*H04L 51/046* (2022.01)
*G06F 3/0482* (2013.01)
(Continued)

(52) U.S. Cl.
CPC .............. *G09B 5/04* (2013.01); *G06F 3/0482* (2013.01); *G06Q 10/1093* (2013.01); *G06Q 30/0282* (2013.01); *G06Q 50/10* (2013.01); *G06Q 50/205* (2013.01); *G09B 5/065* (2013.01); *G10L 15/19* (2013.01); *G10L 15/22* (2013.01); *G10L 15/30* (2013.01); *H04L 51/046* (2013.01); *H04L 51/216* (2022.05)

(58) Field of Classification Search
CPC ......... G09B 5/04; G09B 19/06; G04L 51/216; G06F 40/40; G06F 40/56
See application file for complete search history.

(56) References Cited

U.S. PATENT DOCUMENTS

| | | |
|---|---|---|
| 7,099,798 B2 | 8/2006 | Yu et al. |
| 2004/0175687 A1 | 9/2004 | Burstein et al. |

(Continued)

FOREIGN PATENT DOCUMENTS

WO    2015161293    10/2015

OTHER PUBLICATIONS

Kweon, et al., "A grammatical error detection method for dialog-based CALL system", Journal of Natural Language Processing, 12(4), 2005, pp. 137-156 (Year: 2005).*
(Continued)

*Primary Examiner* — Dmitry Suhol
*Assistant Examiner* — Alyssa N Brandley
(74) *Attorney, Agent, or Firm* — Schmeiser, Olsen & Watts LLP

(57) ABSTRACT

Described is a global language education and conversational chat system. The system includes a user computing device, a language speaker computing device and a server having a memory, wherein the user computing device and the language speaker computing device are coupled to the server through a connection established by an app operating on each of the user computing device and the language speaker computing device. The system operates to connect the user computing device and the language speaker computing device for an audio or an audio/video chat in the language of the language speaker. The system includes components that may provide recording of chats, analysis of chats and reports on proficiency, accuracy, and the like, of the user speaking the language foreign to the user.

16 Claims, 8 Drawing Sheets

Related U.S. Application Data

(60) Provisional application No. 62/886,536, filed on Aug. 14, 2019.

(51) Int. Cl.

| | | |
|---|---|---|
| *G06Q 10/1093* | (2023.01) | |
| *G06Q 30/0282* | (2023.01) | |
| *G06Q 50/10* | (2012.01) | |
| *G06Q 50/20* | (2012.01) | |
| *G09B 5/04* | (2006.01) | |
| *G09B 5/06* | (2006.01) | |
| *G10L 15/19* | (2013.01) | |
| *G10L 15/22* | (2006.01) | |
| *G10L 15/30* | (2013.01) | |
| *H04L 51/216* | (2022.01) | |

(56) References Cited

U.S. PATENT DOCUMENTS

| | | |
|---|---|---|
| 2007/0015121 A1 | 1/2007 | Johnson et al. |
| 2007/0048697 A1 | 3/2007 | Du et al. |
| 2009/0317776 A1 | 12/2009 | Keim et al. |
| 2010/0261150 A1 | 10/2010 | Matwick |
| 2010/0304342 A1 | 12/2010 | Zilber |
| 2011/0143323 A1* | 6/2011 | Cohen .................... G09B 5/04 |
| | | 434/157 |
| 2013/0311409 A1 | 11/2013 | Ye et al. |
| 2014/0356822 A1* | 12/2014 | Hoque ................... G09B 19/04 |
| | | 434/185 |
| 2015/0134426 A1 | 5/2015 | Lejcher et al. |
| 2015/0185966 A1* | 7/2015 | Osipov ............... H04L 12/1822 |
| | | 715/753 |
| 2016/0140244 A1 | 5/2016 | Gerding et al. |
| 2017/0195495 A1* | 7/2017 | Deora ................... H04L 67/306 |
| 2018/0052820 A1* | 2/2018 | Abou Mahmoud .. H04L 67/535 |
| 2018/0226067 A1* | 8/2018 | Dhoolia ................... G10L 15/18 |
| 2019/0088151 A1* | 3/2019 | Chen ................... A61B 5/4803 |
| 2019/0124020 A1 | 4/2019 | Bobbarjung et al. |
| 2019/0132214 A1 | 5/2019 | Porras et al. |
| 2019/0341050 A1* | 11/2019 | Diamant .............. G06V 40/172 |

OTHER PUBLICATIONS

Uber, "Pricing: What's happening when prices surge?", (Apr. 23, 2021) [retrieved on Aug. 14, 2025]. Retrieved from the Internet <https://www.uber.com/us/en/marketplace/pricing/surge-pricing/> (Year: 2021).*

Isgar, Charles, Global Language Education and Conversational Chat System, Patent Cooperation Treaty Application Serial No. PCT/US21/45876, filed on Aug. 13, 2021, International Search Report dated Dec. 14, 2021.

* cited by examiner

GLOBAL LANGUAGE EDUCATION AND CONVERSATIONAL CHAT SYSTEM

CROSS REFERENCE TO RELATED APPLICATION

This application is a continuation of U.S. Patent Application entitled "GLOBAL LANGUAGE EDUCATION AND CONVERSATIONAL CHAT SYSTEM," Ser. No. 16/993,200, filed Aug. 13, 2020, which claims priority to U.S. Provisional Patent Application entitled "GLOBAL LANGUAGE EDUCATION AND CONVERSATIONAL CHAT SYSTEM," Ser. No. 62/886,536, filed Aug. 14, 2019, the disclosures of which are hereby incorporated entirely herein by reference.

BACKGROUND OF THE INVENTION

Technical Field

This invention generally relates to a language education and conversational system, and more specifically to a system for a user to engage with audio or audio/video chats with language speakers anywhere globally as part of learning a language and/or conversation in a foreign language.

State of the Art

There are many people that seek to learn new languages. Often teens and adults are taught a language in high school or college by teachers or professors, however, many students lack the ability to practice speaking that language outside of the classroom. Further still, there may be a desire to learn and/or reinforce a language but not enough time to take a class in a school the traditional way. Regardless of the manner of the language learning, there lacks a system that can connect language speakers with those seeking to learn a language (language students), wherein the language students can have the ability to speak with or chat with language speakers in a time and place that is convenient for the language student outside of the classroom. Additionally, some individuals may just seek to utilize a second learned language and wish to speak with an individual conversationally or to improve skills in that second learned language.

Accordingly, there is a need for a system that allows a user to spontaneously engage in chats with language speakers anywhere globally, at a convenient, on-demand time.

SUMMARY OF THE INVENTION

An embodiment includes a global language chat system comprising: a user computing device; a language speaker computing device; and a server having a memory storing user information including at least one language identifier and language speaker information including at least one language identifier, wherein the user computing device and the language speaker computing device are coupled to the server through a connection established by an app operating on each of the user computing device and the language speaker computing device, and wherein the server is programmed to: receive a signal that includes language speaker identity data from the language speaker computing device, process the signal, and access the language speaker information corresponding to the language speaker identity data, wherein the server places the language speaker in an available for chatting condition; receive a signal that includes user identity data from the user computing device, process the signal, and access the user information corresponding to the user identity data, wherein the server retrieves the language speaker information that is in the available for chatting condition and has a language identifier that corresponds to the at least one language identifier in the user information; send for display on the user computing device a list of language speakers that are in the available for chatting condition and have a language identifier that corresponds to the at least one language identifier in the user information; receive a signal from the user computing device requesting a chat with a language speaker selected from the list of language speakers; and, in response to receiving the request for a chat, establish a connection between the selected language speaker and the user, the connection being established through the server.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to a system for a user to spontaneously engage with audio or audio/video chats with language speakers anywhere globally as part of a casual or recreational chat or for learning a language. While the figures depict a native English speaker utilizing the system, it is understood that the system may be used by speakers of any language seeking to learn a different language. The system may include the use of a mobile application operating on a user computing device that may be a mobile computing device like a smartphone, a tablet, a wearable, and the like; and/or the system may operate on any type of computing device as a downloadable application or even as a web application. The system may also include the use of programmed instructions operating on a server and communicating with the user computing device in order to provide the functionality of the system.

Figure 1:
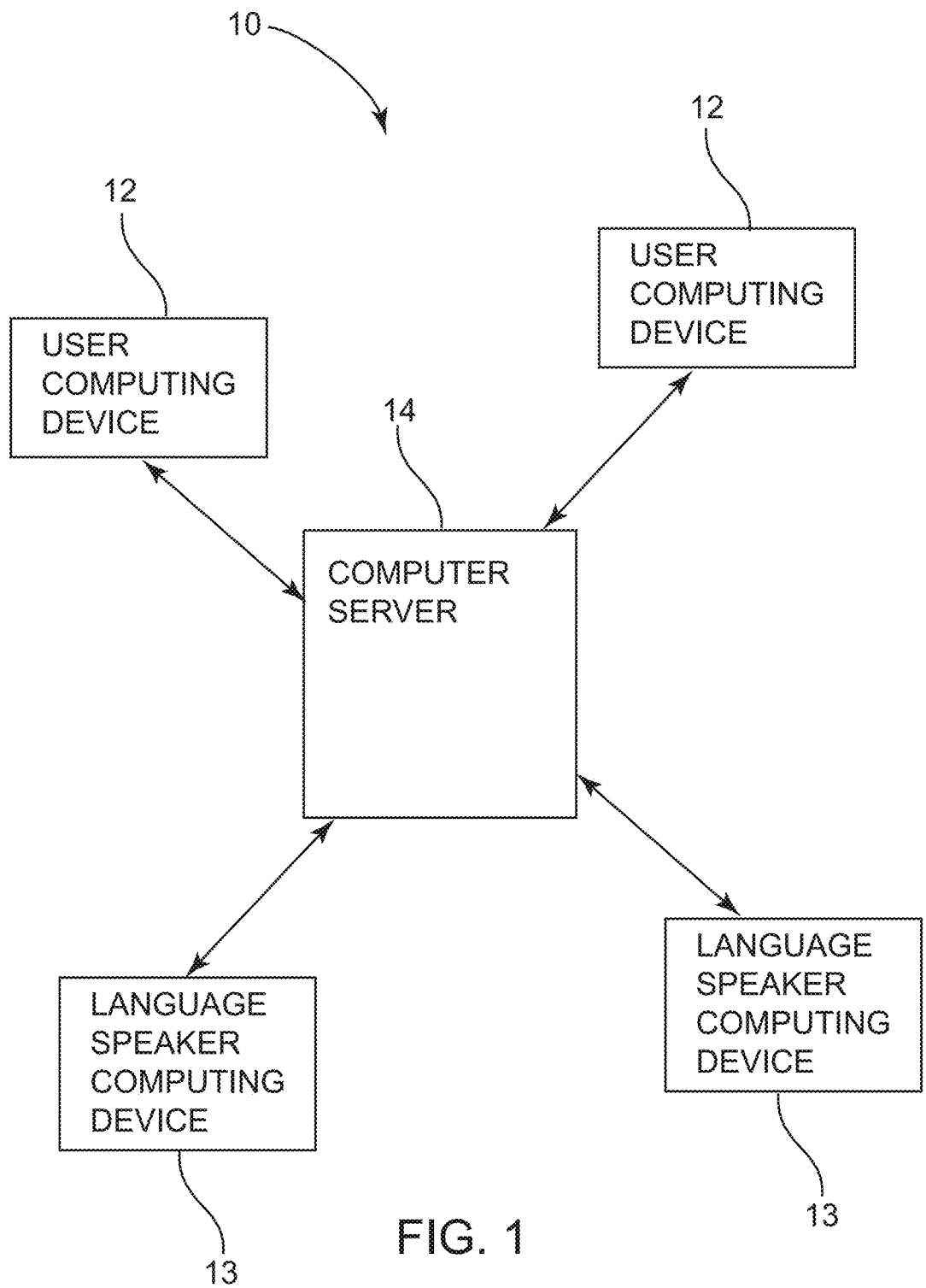
FIG. 1 is a diagrammatic view of a global language chat system according to an embodiment.

FIG. 1 depicts an embodiment of a global language and conversational chat system 10. The system 10 may include user computing devices 12, language speaker computing devices 13, and a server 14, wherein each user computing device 12 and language speaker computing device 13 is coupled to the computer server 14. This coupling may be a network connection, such as a wireless connection through an Internet connection, a Wi-Fi connection, a Bluetooth connection or the like, wherein the user computing devices 12 and the language speaker computing devices 13 may communicate with and receive communication from the server 14. Each of the user computing device 12 and the language speaker computing device 13 may be any of a desktop computer, a laptop, a tablet, a smartphone, a wearable device and the like. The server 14, in some embodiments, may be a computer server or a cloud-based infrastructure architecture.

The server 14 may include a memory storing user information, including, without limitation, name, login information, at least one language identifier, and storing language speaker information, including, without limitation, name, login information, and at least one language identifier.

The user computing device 12 and the language speaker computing device 13 may be coupled to the server 14, and the server 14 may be programmed to receive a signal that includes language speaker identity data from the language speaker computing device, and process the signal and access the language speaker information corresponding to the language speaker identity data, wherein the server places the language speaker in an available for chatting condition; receive a signal that includes user identity data from the user computing device, and process the signal and access the user information corresponding to the user identity data, wherein the server retrieves the language speaker information that is in the available for chatting condition and has a language identifier that corresponds the at least one language identifier in the user information; send for display on the user computing device a list of language speakers that are in the available for chatting condition and have a language identifier that corresponds to the at least one language identifier in the user information; receive a signal from the user computing device requesting a chat with a language speaker selected from the list of language speakers; and in response to receiving the request for a chat, establish a connection between the selected language speaker and the user, the connection being established through the server.

While it is described that server 14 may be programmed to connect the user computing device 12 and the language speaker computing device 13 through the server 14, it is contemplated that, in some embodiments, the user computing device 12 and the language speaker computing device 13 may be connected directly. In such embodiments, the system may include the ability of the user computing device 12 to record and store the chat locally on the user computing device 12 or on the language speaker computing device 13. The recorded chat may then be sent to the server 14 for storage. It will be understood that recording chats in any embodiment will be done in accordance with local laws and rules. In some embodiments, the user may have the option of opting in and/or out of recorded chats.

Figure 2:
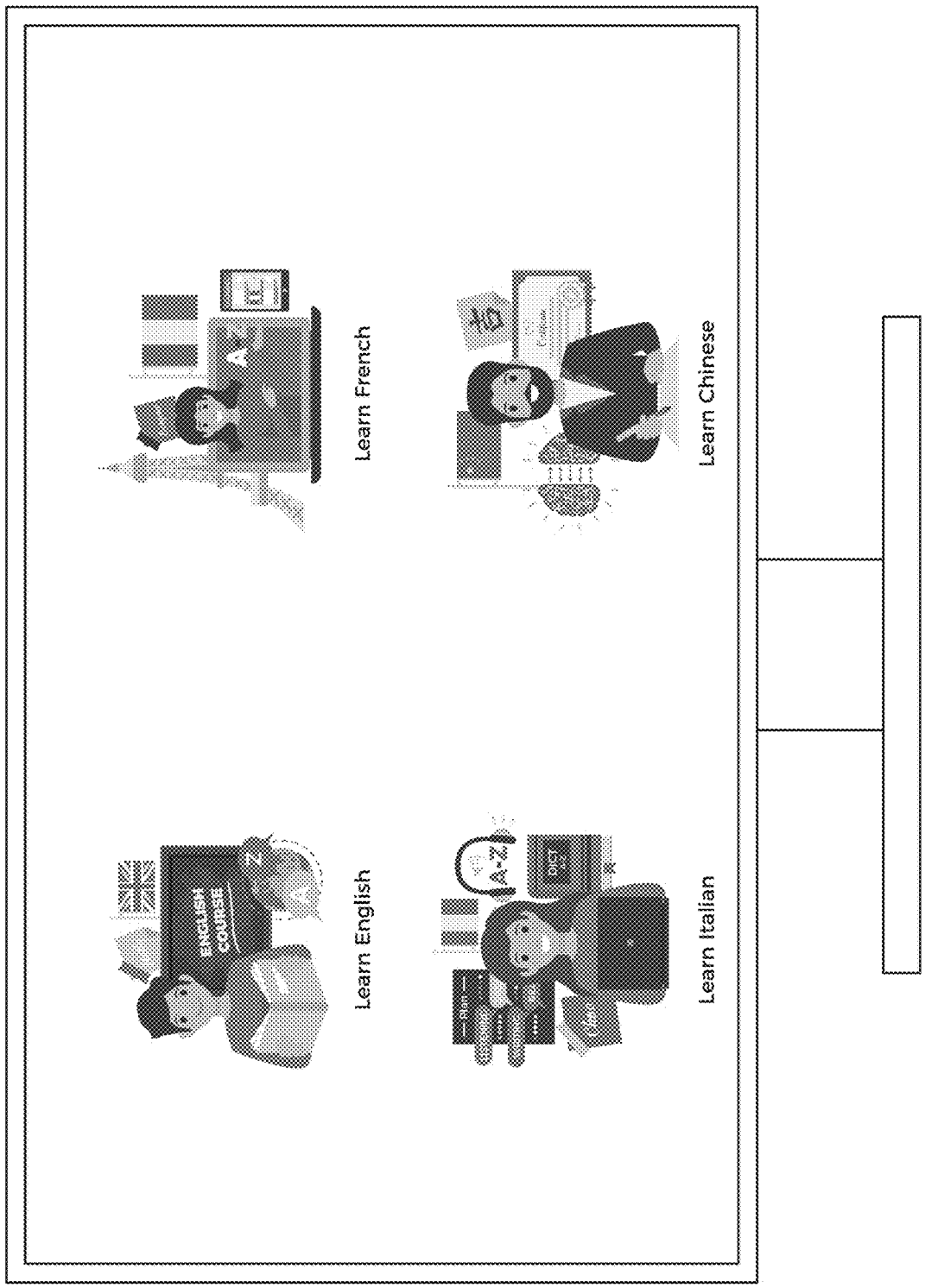
FIG. 2 is a front view of a computer monitor displaying a portion of languages for learning using the global language chat system according to an embodiment.
Figure 3A:
FIGS. 3A-3D are views of user computing devices in connection in a chat with a language speaker computing device using the global language chat system in accordance with an embodiment.
Figure 3B:
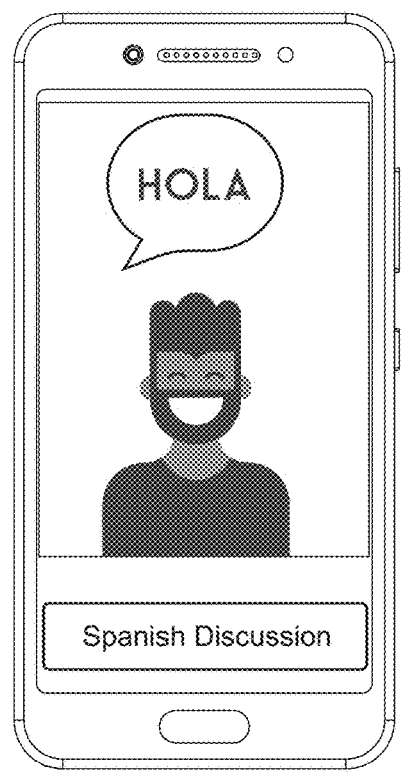
Figure 3C:
Figure 3D:
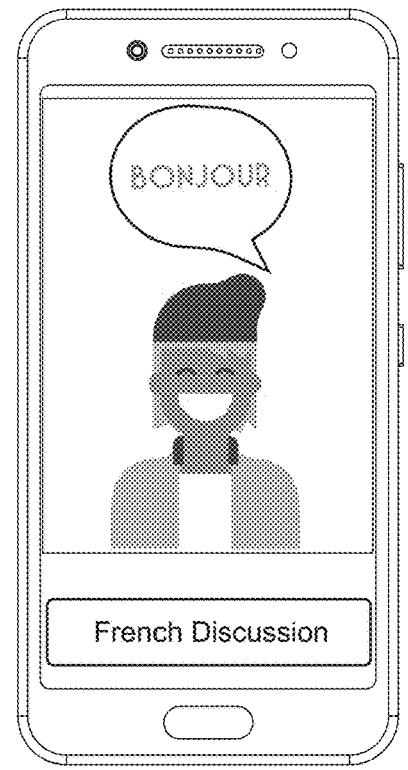

While the system 10 may be used for casual or recreational chats, other embodiments may be utilized for education. For example, FIG. 2 depicts a computer monitor displaying a portion of the languages that may be taught corresponding to use of the system 10.

Figure 5:
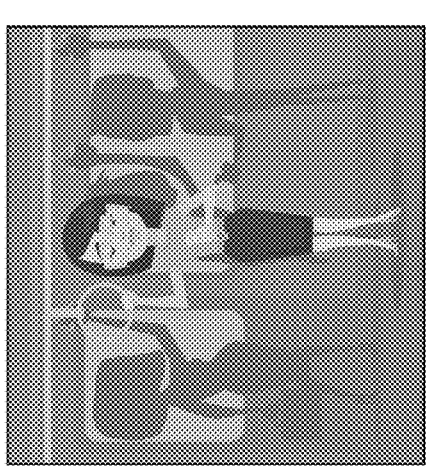
FIG. 5 depicts various views of users accessing the global language chat system from various locations in accordance with an embodiment.
Figure 5:
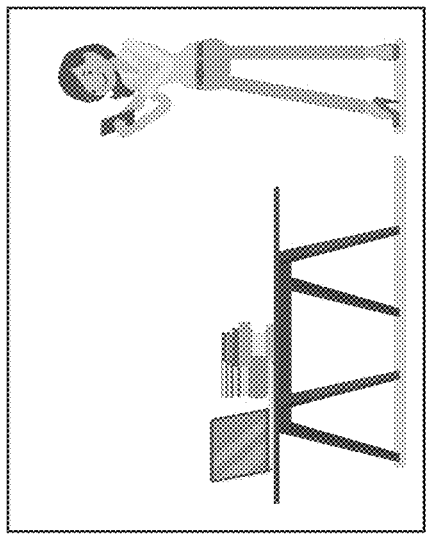
Figure 5:
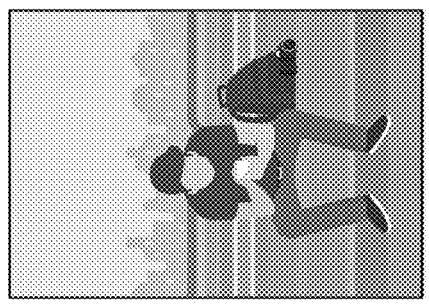
Figure 5:
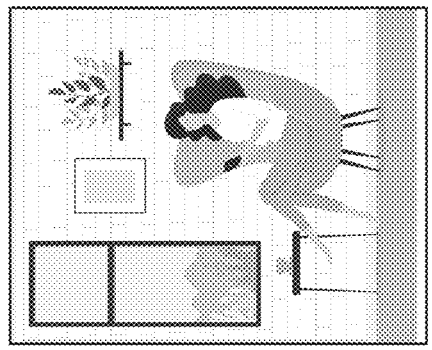
Figure 5:
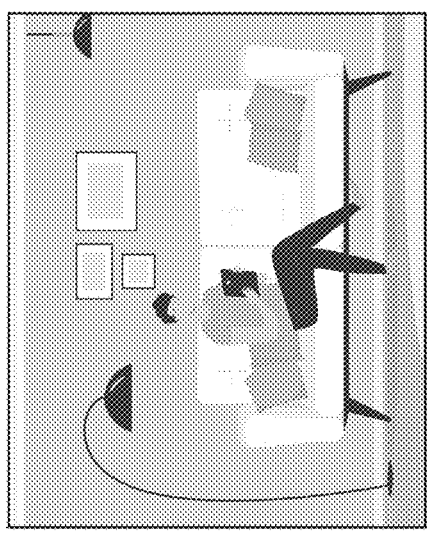
Figure 5:
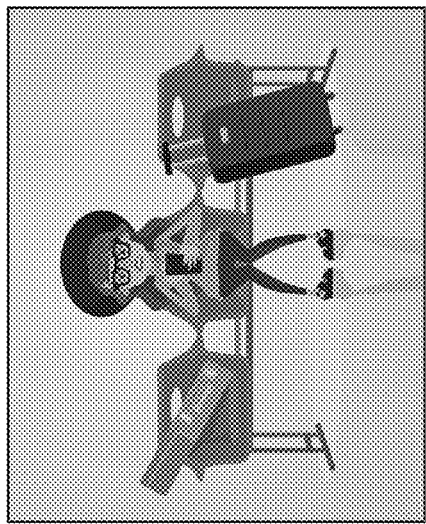

When a user computing device 12 and the language speaker computing device 13 are coupled together through the server 14, the user may engage in a verbal audio or video chat with the language speaker. FIGS. 3A-3D display the utilization of the user computing device 12 to chat, using the system 13, in various languages, such as, but not limited to, German (FIG. 3A), Spanish (FIG. 3B), Italian (FIG. 3C), French (FIG. 3D), and the like. Further still, users may engage in chats, using the system 10, at any time and in any place, as depicted in FIG. 5. This makes the system 10 a type of on-demand system.

Figure 4:
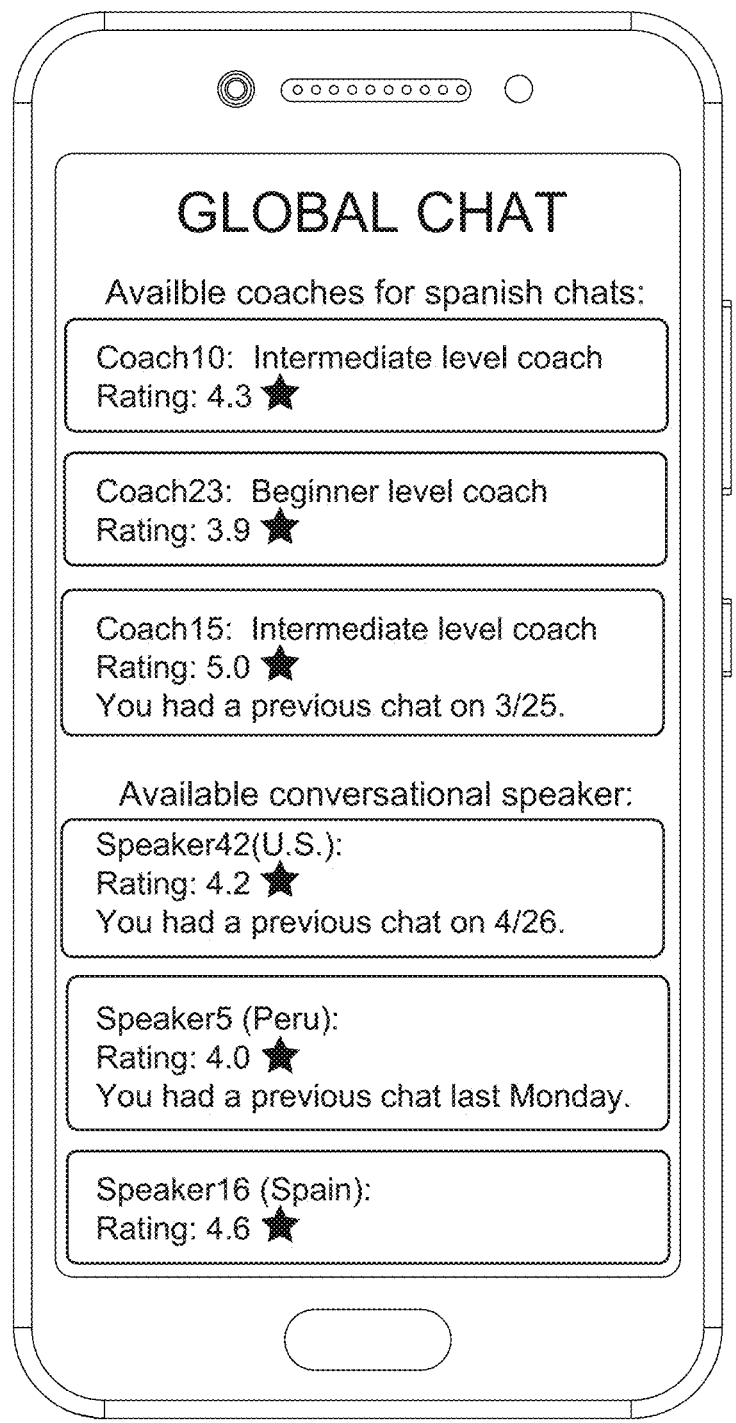
FIG. 4 is a view of a user computing device displaying language speakers available for a chat using a global language chat system in accordance with an embodiment.

Before such a chat may be established, the user computing device 12, as shown in FIG. 4, may depict, in a user interface, a list of language speakers that are in an available to chat condition. These language speakers may operate as a coach (for education uses), as a conversationalist or speaker (for conversational use), or the like. The language speakers' participation in the system, in some cases, may not require training or other prerequisites outside of being able to speak the language, which often is their native language. Further still, language speakers may or may not be bilingual or multi-lingual. However, having these capabilities may improve the language speakers' ranking and/or may increase desirability in being a coach on the system. Bilingual or multi-lingual skills are not expected or required to be a language speaker in conversational use of the system.

The list of language speakers may include a rating level of the language speaker, the country or region of the language speaker, a level of the user that the language speaker is identified with and so forth, such as, but not limited to, beginner, intermediate and advanced. This allows a user to select a language speaker with a desired rating and also having the ability corresponding to the user's level of speaking that language. This allows the language speaker, operating as a coach, to give real-time feedback on the user's speaking by such things as helping the user correctly say a word or phrase, identifying the meaning of a word such as by explanation or display of a picture of the word, and the like. Further still, the user may select available conversational speakers or conversationalists also shown in FIG. 4. As further shown in FIG. 4, the language speaker list may also indicate the language speakers the user has previously chatted with along with the date and duration of the last chat. Further still, the user may designate language speakers as favorites. The user may sort by these various labels, tags, or forms of language speaker identifying information. The selection of any of these soft buttons, when selected, may initiate an audio or audio/video chat between the user and the language speaker.

Figure 6:
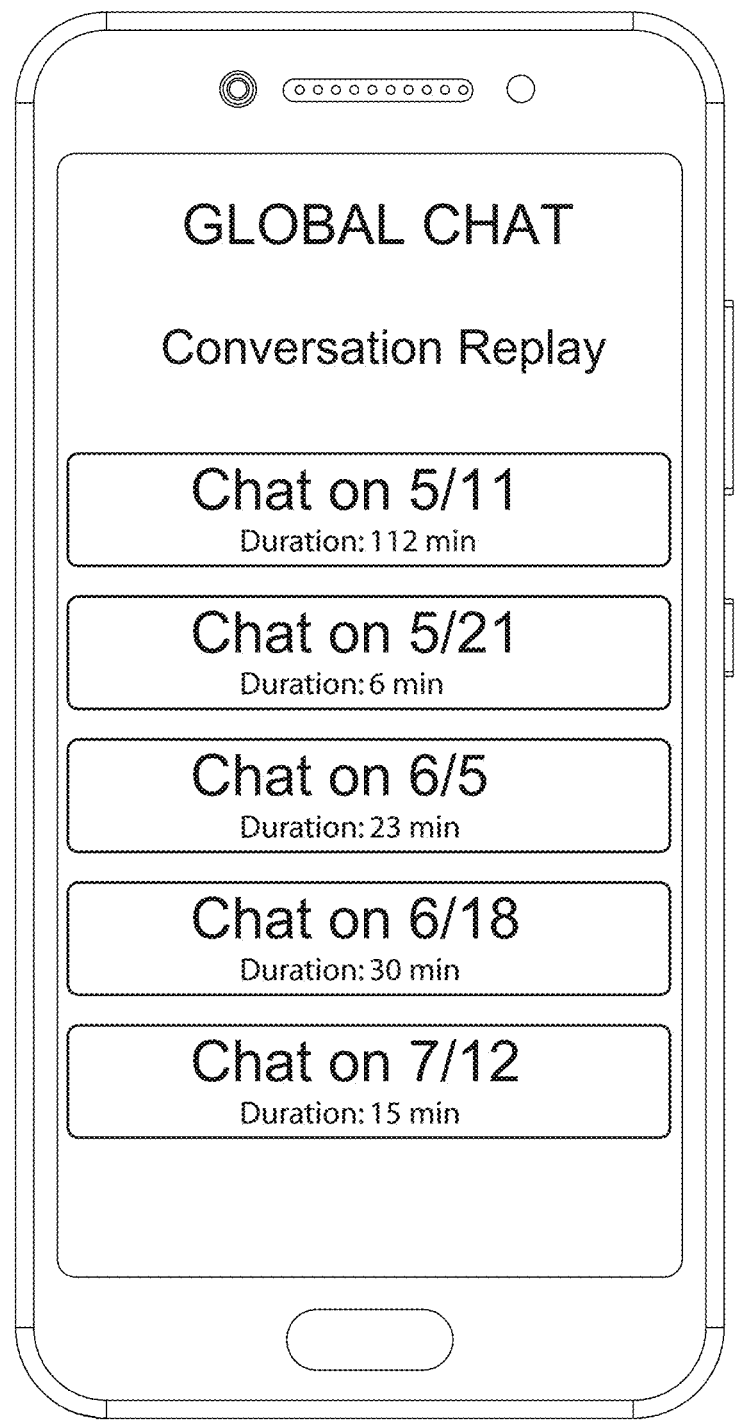
FIG. 6 is a view of a user computing device displaying past recorded and stored chats available for playback and review in accordance with an embodiment.

In embodiments, as depicted in FIG. 6, the system 10 may record the chats and store the same in a database in the memory of the server 14. This allows a user or a language speaker to access, replay and review past chats that the user or the language speaker were a part of (FIG. 6). Selection of a soft button on the user computing device 12 or the language speaker computing device 13 results in a user interface being displayed and the selected chat being replayed on the user computing device 12 or the language speaker computing device 13, respectively. This allows each party to hear how they sound utilizing the foreign language.

Figure 7:
FIG. 7 is a view of a user computing device displaying reports corresponding to past chats available for review in accordance with an embodiment.

In embodiments, as depicted in FIG. 7, the system 10 may review and develop data reports related to the chats, wherein the data reports may include accuracy of word usage, pronunciation, sentence structure, comprehension, understanding and the like. This information may be stored in a database in the memory of the server 14. These reports may be available to the user through the user computing device 12. This allows a user or a language speaker to access and review reports corresponding to past chats that the user was a part of (FIG. 7). Selection of a soft button on the user computing device 12 results in a user interface being displayed and the selected report being provided to the user computing device 12. This allows each party to obtain feedback on how they speak a foreign language. Additionally, a supervisor, such as an employer, teacher or the like may obtain reports that provide proficiency evaluation of the user's foreign language speaking ability. The reports may include the amount to time engaged in one or more chats and can be used as proof of time completion if such proof is required by the supervisor.

Figure 8:
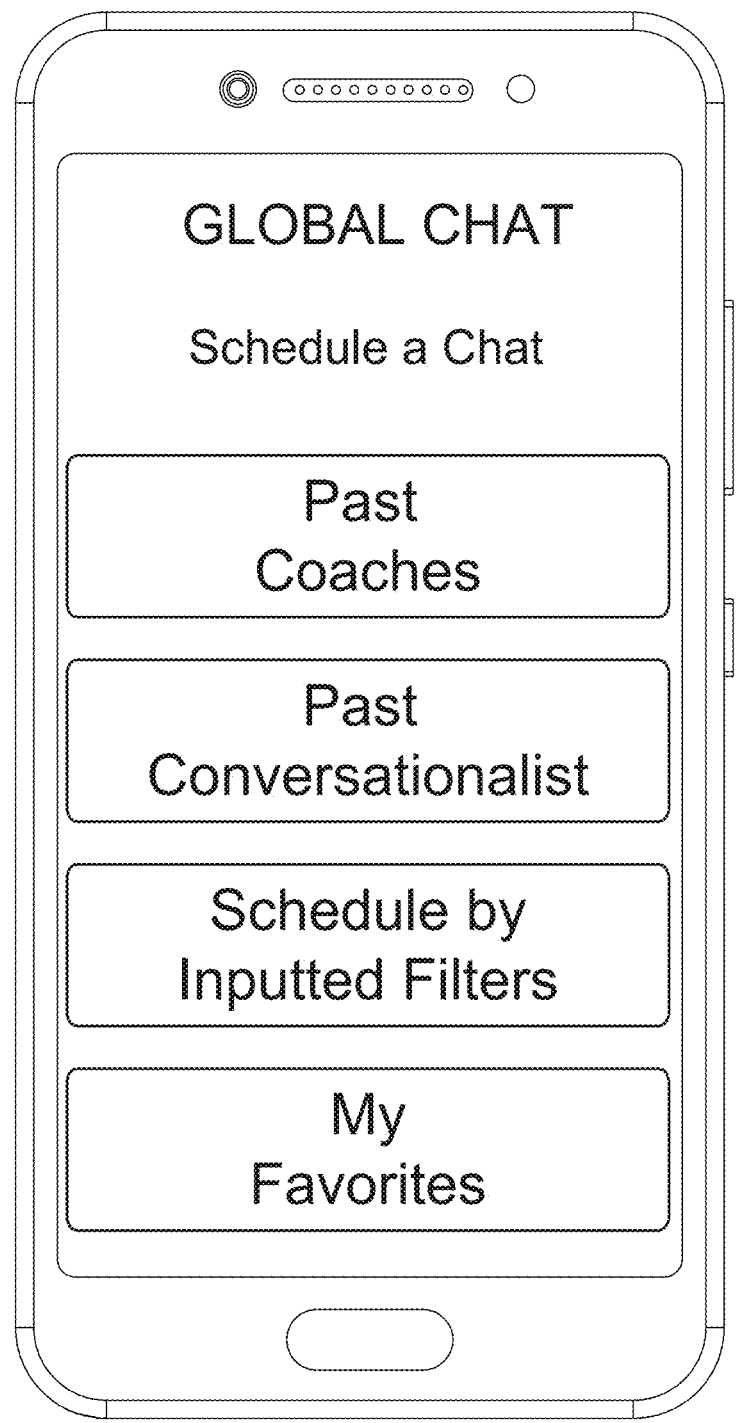
FIG. 8 is a view of a user computing device displaying a schedule chat interface in accordance with an embodiment.

Referring further to the drawings, FIG. 8 depicts a schedule chat interface displayed on a user computing device 12. The user may select, on his or her device, one of several options for scheduling, such as, but not limited to, past coaches, past conversationalists, schedule by inputted filters, my favorites and the like. The user may select past coaches and then schedule another chat with a past coach in a time that is either convenient for the user or when the coach is available. The user may select past conversationalists and then schedule another chat with a past conversationalist in a time that is either convenient for the user or when the conversationalist is available. The user may select to schedule by inputted filters, wherein the filters may be country/region of speaker, time available, price, rating level, favorites, and the like. The user may also schedule with a user's favorites. Any of these forms of scheduling allows the user to establish a recurring day/time for a chat with the selected language speaker.

In some embodiments, the reports may be developed objectively utilizing the server having natural language processing technology incorporated therein. In such embodiments, the server may execute program code to recognize words, sentence structure and identify error in the user's speaking of a particular language. Additionally, this information may be automatically stored, and the server may learn from past stored (historical) data to expand the ability to objectively analyze a conversation and develop a report of the same. Further still, the system may utilize the natural language processing technology to create a transcript of the chat. All data and information gathered by the system 10 may be stored and aggregated in order to improve the operation of the system and improve the reliability of machine artificial intelligence review of chats in order to automate reporting of a user's progress in speaking a particular language.

As part of learning a language, the system may store a log of hours that a user computing device is accessing the system and further log how much time is spent in chatting, reviewing chats or reviewing reports. This can be utilized for review by a supervisor of a person's progress in learning.

The system 10 may include advertising or messaging built into the system for revenue. The system may have dynamic pricing based on availability and demand for certain languages at a particular time. For example, the system may provide utilization on a per minute on demand system, wherein there may be a certain price per minute that may or may not be purchased in blocks of time increments. This price per minute may change depending upon demand at times, such as a time that historically has many users accessing the system for a chat. In some embodiments, it is contemplated that there may be a surge in users accessing the system for certain high-demand reasons, such as, but not limited to, students at a college preparing for a specific language final examination. In these instances, the system may identify the surge of users accessing the system and assess that there are not enough language speakers of that specific language to accommodate the users. The system may then send an alert to language speakers of that specific language to login to the system. Further, the system may increase the compensation to language speakers who engage in chats during a user surge, which costs may be passed on to the user. The system may also allow the user to schedule time with a preferred language speaker such as a coach or a preferred conversationalist. These types of system components accommodate the modern consuming trends and capitalizes on efficiencies in communication, accounting and billing for services.

It should be understood that there may be many different uses of the system 10. For example, and without limitation, the system may be used by a business man or woman who could request that a paper or journal that is printed in foreign language be read to him or her; may be used by a business man or woman who could request coaching on basic greeting before a business meeting; could have images that help coach the user to pronounce a certain word or read certain sentences; may include live video chat for facial contact and expression; may be used in a multi-party call (3 or more), wherein the multi-party call may include a language speaker acting as an interpreter or may be a virtual class setting or may be the user inviting and connecting another person to the chat; may be used for a bedtime story feature for kids to get read a story each night; may be used for a recreational conversation; may be used to practice a correct accent for the language of a desired country/region; and the like.

Embodiments may be available on or through the internet, such as through domain names reserved and owned by Applicant that include Chat2learn.com, Chat2learn.education, Lingo.guru, Lingo.expert, Lingonow.com, Lingo-chat.com, Dialectme.com, Dialectgo.com, Dialecthub.com, GPSlanguage.com, Chatanalysis.com, Chatwithnatives.com, Oldcountrychat.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A global language chat system comprising:
   a user computing device;
   a language speaker computing device; and
   a server having a memory storing user information including at least one language identifier and language speaker information including at least one language identifier, wherein the user computing device and the language speaker computing device are coupled to the server through a connection established by an app operating on each of the user computing device and the language speaker computing device, and wherein the server is programmed to:
   receive a signal that includes language speaker identity data from the language speaker computing device corresponding to a language speaker of the language speaker computing device, process the signal, and access the language speaker information corresponding to the language speaker identity data, wherein the server places the language speaker in an available for chatting condition;
   receive a signal that includes user identity data from the user computing device corresponding to a user of the user computing device, process the signal, and access the user information corresponding to the user identity data, wherein the server retrieves the language speaker information that is in the available for chatting condition and has a language identifier that corresponds to the at least one language identifier in the user information;

send for display, on the user computing device, a list of language speakers that are in the available for chatting condition and have a language identifier that corresponds to the at least one language identifier in the user information;

receive a signal, from the user computing device, requesting a chat with a language speaker selected from the list of language speakers;

in response to receiving the request for a chat, establish a connection between the selected language speaker and the user, the connection being established through the server;

utilize natural language processing technology to create a transcript of the chat;

detect a surge of users accessing the system and requesting chats with language speakers that speak a high demand language, dynamically adjust pricing for chats with language speakers of the high demand language based on the detected surge, and send an alert to language speakers that speak the high demand language to login to the system in response to the surge; and send for display, on the user computing device through use of the app, a chat data report automatically generated by the server through machine artificial intelligence in response to the server determining accuracy of word usage, pronunciation, sentence structure, comprehension and understanding.

2. The system of claim 1, wherein an option is provided, through the app, for the user to choose whether the chat is recorded.

3. The system of claim 2, wherein the chat is recorded, and a recording of the chat is sent from the user computing device to the server for storage on the server.

4. The system of claim 2, wherein the server is further programmed to establish a connection directly between the selected language speaker computing device and the user computing device.

5. The system of claim 3, wherein the recording of the chat between the selected language speaker and the user is recorded and stored on at least one of the user computing device and the selected language speaker computing device.

6. The system of claim 3, wherein selection of a soft button, corresponding to the recorded chat, on a computing device, wherein the computing device is one of the user computing device or the selected language speaker computing device, results in a user interface being displayed and the selected recorded chat being replayed on the computing device.

7. The system of claim 1, wherein the connection allows a communication means, between the user and the selected language speaker, through the connection, selected from the group consisting of audio, video and a combination thereof.

8. The system of claim 1, wherein the user information includes a proficiency rating of the user.

9. The system of claim 1, wherein the list of language speakers includes a proficiency rating of each language speaker of the list of language speakers, wherein the user selects a language speaker based on the proficiency rating of the language speaker.

10. The system of claim 1, wherein the list of language speakers includes indicators indicating those language speakers of the list of language speakers that the user has previously chatted with.

11. The system of claim 10, wherein each indicator includes a chat date and a chat duration associated with a corresponding previous chat between the user and the corresponding language speaker.

12. The system of claim 1, wherein the server is further programmed to send for display on the user computing device a schedule chat interface, wherein the server stores a scheduled chat information and sends the scheduled chat information to a scheduled language speaker in response to the user creating a scheduled chat with the scheduled language speaker through the schedule chat interface.

13. The system of claim 1, further comprising the natural language processing technology operating on the server, wherein the server executes program code of the natural language processing technology to analyze language speaking proficiency of the user, store language speaking proficiency information of the user, and generate a report of the language speaking proficiency information.

14. The system of claim 13, wherein the server utilizes the natural language processing technology to create and store the transcript of the chat between the user and the selected language speaker.

15. The system of claim 1, wherein the server is further programmed to store a log of time information, wherein the time information is selected from the group consisting of time spent by a user computing device accessing the system, time spent by a user in chatting, time spent by a user reviewing chats, time spent by a user reviewing reports, and any combination thereof.

16. The system of claim 1, wherein the server is further programmed to display advertisements on the user computing device and/or the language speaker computing device.

* * * * *